(12) United States Patent
Ramasubramanian et al.

(10) Patent No.: US 12,051,079 B2
(45) Date of Patent: Jul. 30, 2024

(54) ONLINE TRANSACTION METHOD, SYSTEM, AND COMPUTER-READABLE NON-TRANSITORY MEDIUM FOR IDENTIFYING COUNTERFEITS

(71) Applicant: eBay Inc., San Jose, CA (US)

(72) Inventors: Anand Ramasubramanian, San Ramon, CA (US); Alagu Muthuraman, Los Altos, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/243,516

(22) Filed: Apr. 28, 2021

(65) Prior Publication Data

US 2022/0351215 A1  Nov. 3, 2022

(51) Int. Cl.
*G06Q 30/018* (2023.01)
*G06Q 30/0241* (2023.01)
*G06Q 30/0601* (2023.01)

(52) U.S. Cl.
CPC ..... *G06Q 30/0185* (2013.01); *G06Q 30/0248* (2013.01); *G06Q 30/0609* (2013.01)

(58) Field of Classification Search
CPC .......... G06Q 30/0185; G06Q 30/0607; G06Q 30/0609; G06Q 30/0601–0645;
(Continued)

(56) References Cited

U.S. PATENT DOCUMENTS 8,374,920 B2    2/2013  Hedges et al.
10,691,922 B2 *  6/2020  Chaloux ............... G06F 40/279
(Continued)

FOREIGN PATENT DOCUMENTS

AU    2022202719 A1   11/2022
CN    115248870 A      10/2022
(Continued)

OTHER PUBLICATIONS

Saeed, M.Q., et al. "An NFC based consumer-level counterfeit detection framework," 2013 Eleventh Annual Conference on Privacy, Security and Trust, pp. 135-142, doi: 10.1109/PST.2013.6596047. (Year: 2013).*

(Continued)

*Primary Examiner* — Allison G Wood
*Assistant Examiner* — Katherine A Barlow
(74) *Attorney, Agent, or Firm* — SCHWEGMAN LUNDBERG & WOESSNER, P.A.

(57) ABSTRACT

Systems and methods are provided for identifying an item that is counterfeit in the marketplace. Sales of counterfeit items in marketplaces, particularly at auction places, have been an issue. There has been a need to automatically detect an item that is counterfeit when a seller submits the item for sale in the marketplace. The disclosed technology receives information about an item for transaction. The information associated with the item includes metadata related to the item and an image of the item. The method uses a database of items that are known to be not for sale (e.g., a stock photo) or is otherwise a counterfeit item. The method matches the data of the item against the data in the database and identifies the item as counterfeit based on the matched result. The matching operation includes analyzing the data (e.g., image analyses using features of the image data). Use of the disclosed technology enables automatic and efficient detection of counterfeit items as a seller submits the item for sale in the marketplace, thereby increasing reliability of the marketplace from buyers' perspective.

20 Claims, 6 Drawing Sheets

(58) Field of Classification Search
CPC ........... G06Q 30/0248; G06Q 20/4016; G06Q 30/08; G06Q 30/06; G06Q 30/018; G06T 2207/20076; G06T 2207/20084; G06T 2207/20081; G06V 10/761; G06V 10/74; G06V 10/70; G06N 3/02–105

USPC ........................................ 705/26.1–27.2, 318

See application file for complete search history.

(56) References Cited

U.S. PATENT DOCUMENTS

| | | | | |
|---|---|---|---|---|
| 11,182,801 | B2* | 11/2021 | Siwo | G06Q 30/0185 |
| 2010/0241528 | A1* | 9/2010 | Hedges | G06Q 30/0185 |
| | | | | 705/26.1 |
| 2014/0143090 | A1* | 5/2014 | Deyle | G06Q 10/0833 |
| | | | | 705/26.35 |
| 2014/0279613 | A1* | 9/2014 | Lee | G06Q 30/0185 |
| | | | | 705/318 |
| 2019/0205962 | A1* | 7/2019 | Piramuthu | G06F 16/9035 |
| 2019/0236614 | A1* | 8/2019 | Burgin | G06V 20/80 |
| 2019/0354744 | A1* | 11/2019 | Chaloux | G06F 16/3334 |
| 2021/0004580 | A1* | 1/2021 | Sundararaman | G06N 3/084 |
| 2021/0073648 | A1* | 3/2021 | Lichenstein | G06V 10/82 |
| 2021/0117984 | A1* | 4/2021 | Sharma | G07D 7/20 |
| 2021/0142337 | A1* | 5/2021 | Guinard | G06Q 20/401 |

FOREIGN PATENT DOCUMENTS

| | | | | |
|---|---|---|---|---|
| EP | 4083936 | | 11/2022 | |
| EP | 4083936 | A1 | 11/2022 | |
| GB | 2573766 | A * | 11/2019 | ......... G06Q 30/0185 |
| KR | 20210004256 | A * | 1/2021 | |

OTHER PUBLICATIONS

Cowley, J. et al. "We bought dozens of products from AliExpress, Amazon, eBay, Walmart and Wish. Over half were suspected fakes" Business-Marketplace, CBC.ca (Year: 2020).*

Segran, E. "Nike tried playing nice with Amazon. Here's why it didn't work" FastCompany.com (Year: 2019).*

Biach, Fatima Z. E. et al. "Encoder-decoder based convolutional neural networks for image forgery detection" Multimedia Tools and Applications. vol. 81, pp. 22611-22628. https://doi.org/10.1007/s11042-020-10158-3 (Year: 2021).*

Biswas, Kamanashis, et. al. "Blockchain based wine supply chain traceability system." Future Technologies Conference (FTC) 2017. Vancouver, Canada Nov. 29-30, 2017 United Kingdom: The Science and Information Organization. pp. 56-62 (Year: 2017).*

Huang, L., et al. "Towards Linking Camouflaged Descriptions to Implicit Products in E-commerce." In Proceedings of the 43rd International ACM SIGIR Conference on Research and Development in Information Retrieval (SIGIR '20). Association for Computing Machinery, New York, NY, USA. (Year: 2020).*

Șerban et al., "SpotTheFake: An Initial Report on a New CNN-Enhanced Platform for Counterfeit Goods Detection", Project co-financed from the European Fund of Regional Development through the Competitivity Operational Program, 2014-2020, 7 pages.

Australian Patent Office, "Australian Office Action," issued in connection with Australian Patent Application No. 2022202719 dated Apr. 17, 2023 (4 pages).

Dosovitskiy, A., et al., "An Image is Worth 16x16 Words: Transformers for Image Recognition at Scale", retrieved from Internet URL: <https://arxiv.org/pdf/2010.11929v1.pdf>, arXiv preprint arXiv:2010.11929, Oct. 22, 2020, 21 pages.

European Patent Office, "European search report," issued in connection with European Patent Application No. 22170317.6 dated Sep. 27, 2022 (11 pages).

Wu Haotian, "Pixelmatch 0.1.1", PyPi, Retrieved from Internet URL: https://pypi.org/project/pixelmatch/0.1.1/, Mar. 12, 2020, 5 Pages.

"Australian Application Serial No. 2022202719, First Examination Report mailed Apr. 17, 2023", 4 pgs.

"Australian Application Serial No. 2022202719, Subsequent Examiners Report mailed Aug. 3, 2023", 6 pgs.

"Australian Application Serial No. 2022202719, Subsequent Examination Report mailed Jan. 12, 2024", 9 pgs.

"Australian Application Serial No. 2022202719, Subsequent Examination Report mailed Apr. 10, 2024", 4 pgs.

* cited by examiner

| Item ID 302 | Status 304 | Item Category 306 | Matched Counterfeit Item ID 308 | Seller ID 310 |
|---|---|---|---|---|
| 5001 | Valid | laptop computer | NONE | 1 |
| 5002 | Valid | accessory bag | NONE | 2 |
| 5003 | Suspended-Counterfeit | accessory bag | 8000 | 2 |
| 5004 | Suspended-Stolen | wallet | 8002 | 2 |
| 5005 | Valid | accessory bag | NONE | 2 |

FIG. 3

| Seller ID 402 | Seller Status 404 | Items on the site 406 | Counterfeit Item 408 |
|---|---|---|---|
| 1 | Valid | 5001, 5002. 5005 | NONE |
| 2 | Suspended | | 5003, 5004 |

ONLINE TRANSACTION METHOD, SYSTEM, AND COMPUTER-READABLE NON-TRANSITORY MEDIUM FOR IDENTIFYING COUNTERFEITS

BACKGROUND

Traditional shopping marketplace systems facilitate sales transactions of goods that sellers wish to sell to buyers. For example, auctioning systems receive items for sale from sellers and place them up for a bidding process. Sales of counterfeit items have become an issue when sellers knowing or unknowingly place counterfeit items in the marketplace and the buyers purchase them. Identifying the counterfeit items includes visually comparing the submitted items against a list of criteria for determining whether the goods are genuine or counterfeit. Accordingly, identifying counterfeit items has been a time-consuming task. In practice, buyers need to determine whether items are counterfeits before making purchases. The buyers attempt to determine counterfeit items based on descriptions of items posted on the systems. Preventing transactions of counterfeit items improves effective use of the systems because more sellers and buyers use the systems with confidence. Tracking and reversing transactions of counterfeit items after the transactions take place raises costs of operations. Thus developing a technology that better meets the needs while minimizing trade-offs would be desirable.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

According to the present disclosure, the above and other issues are resolved by identifying a counterfeit item using image analysis based on a machine-learning model.

The present disclosure relates to identifying a counterfeit item in a sales transaction system. In particular, an online shopping server receives an item along with image data of the item for sale. An item matcher matches image data of the item against a collection of images in a database. The database stores image data (e.g., stock photos) of items that are in the same category as the received item. Based on the matched image data, a counterfeit identifier identifies the received item as a counterfeit. Additionally, or alternatively, a transaction disabler disables a sales transaction of the received item because of the received item has been determined to be counterfeit.

The disclosed technology includes a machine-learning model to predict the received item as counterfeit. The machine-learning model includes a neural network with trained parameters to predict matching the item with stock image data. The machine-learning model predicts a likelihood of a match between the item and stock image data using probability distributions on likelihood of the item in match with one or more stock image data with respect to features of the image data. Additionally, or alternatively, the machine-learning model includes a transformer including an encoder and a decoder. The disclosed technology further includes disabling a transaction of the item that has been identified as counterfeit and transmitting an alert about the counterfeit item.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 1 illustrates an overview of an example system for determining an item as counterfeit in accordance to aspects of the present disclosure.

FIGS. 2A-B illustrate example of models in accordance with aspects of the present disclosure.

FIG. 3 illustrates an example of data structures of item information in accordance with aspects of the present disclosure.

FIG. 4 illustrates an example of data structures of seller information in accordance with aspects of the present disclosure.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Online shopping systems, particularly online auctioning systems, rely upon sellers to sell items that are genuine and not counterfeit or help buyers to be aware of a risk that the items might be counterfeit. Traditional on-line shopping sites provide policy-based enforcement that prohibits sales transactions of counterfeit items. However the traditional systems merely provided interface for sellers to interactively declare, by a click-through or a checkbox for example, that the items are not counterfeit before placing the items for transaction. The traditional systems failed to automatically determine whether the items are counterfeit. Transactions of counterfeit items may negatively influence not just sellers of the items, but also the reputations of online shopping services that use the systems. In some aspects, sellers are not aware when the item is counterfeit.

Issues arise when an online shopping site needs to identify and prevent counterfeit items from listing among tens of millions of items on the online shopping site. There may be even more than tens of millions of counterfeit items to check against. Accordingly, there is a trade-off between protecting an online marketplace from counterfeit items and costs of doing so. The present application solves this trade-off issue by providing a system that automatically identifies counterfeit items using a machine-learning model with image analysis. The present application enables balancing competing demands of safety and efficiency of the marketplace by use of the automatic counterfeit identifier.

As discussed in more detail below, the present disclosure relates to a machine-learning, counterfeit identification model for identifying counterfeit items in an online shopping marketplace. In particular, the counterfeit identification model predicts whether an item is counterfeit by analyzing image data of the item using a collection of image data of items.

Figure 1:
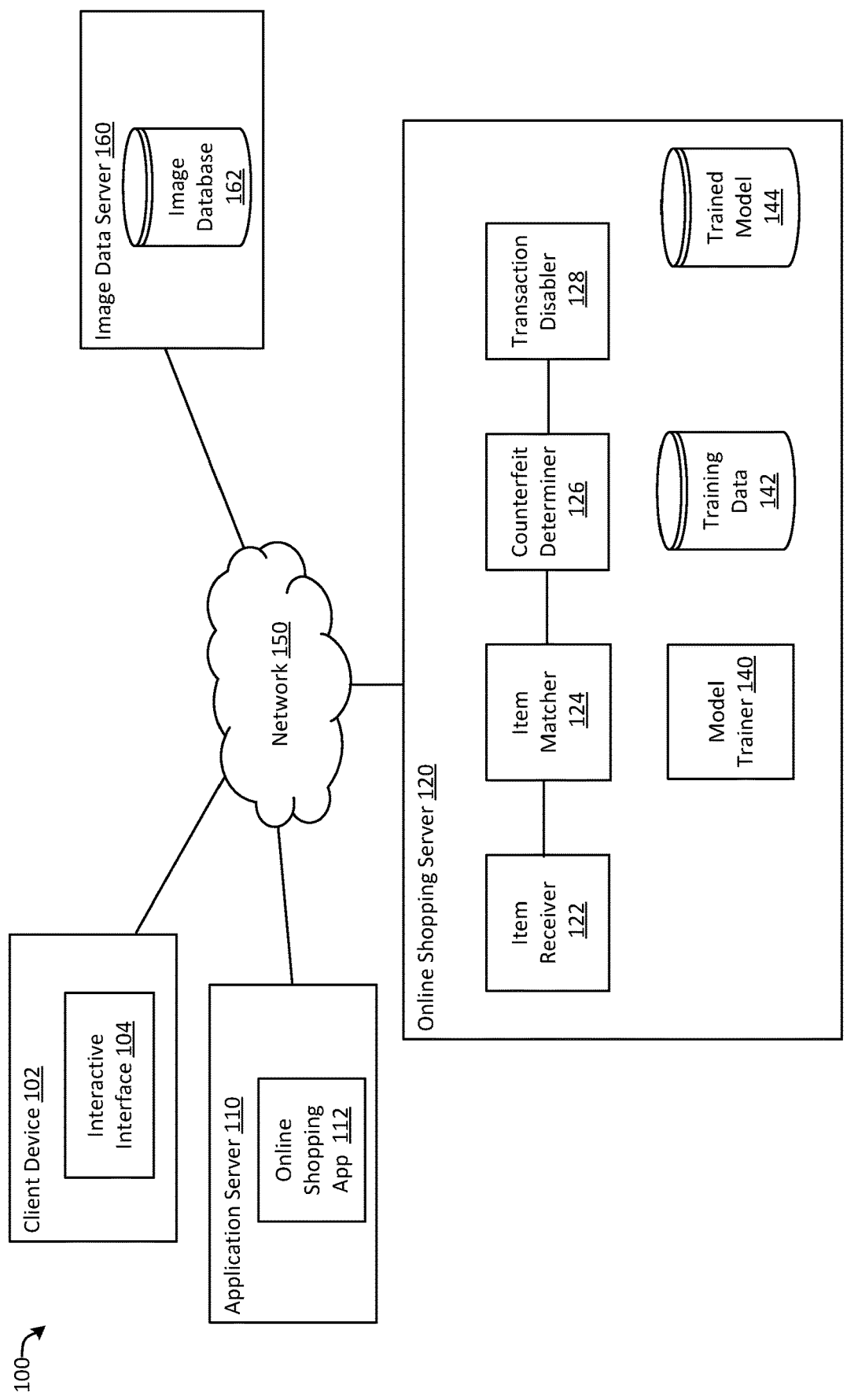

FIG. 1 illustrates an overview of an example system 100 for identifying a counterfeit item. System 100 represents a system for using a counterfeit identification model (or models) to identify a counterfeit item based on an image analysis of image data of the item. System 100 includes a client device 102, an application server 110, an online shopping server 120, a network 150, and an image data server 160. The client device 102 communicates with the application server 110, which includes one or more sets of instructions to execute as applications on the client device 102. The application server 110 includes an online shopping app 112 (i.e., an application). The one or more sets of instructions in the application server 110 may provide an interactive user interface (not shown) through an interactive interface 104.

The online shopping server 120 includes an item receiver 122, an item matcher 124, a counterfeit determiner 126, a transaction disabler 128, a model trainer 140, training data 142, and a trained model 144. The network 150 provides network connectivity among the client device 102, the application server 110, and the online shopping server 120, and the image data server 160. The image data server 160 includes an image database 162. The image database 162 stores image data of items. The image data server 160 stores and serves image data to the online shopping server 120 over the network 150.

The client device 102 connects with the application server 110 via the network 150 to execute applications that include user interactions through the interactive interface 104. The application server 110 interacts with the client device 102 and the online shopping server 120 via the network 150 to perform online shopping as a seller or a buyer of items.

The client device 102 is a general computer device providing user-input capabilities e.g., via the interactive interface 104 for online shopping over the network 150. In some aspects, the client device 102 optionally receives user input from a seller of items. The seller uploads information about an item for sales transactions in an online shopping marketplace. The information about the item includes image data of the item, a brief description of the item, price information, quantity information, and the like. The interactive interface 104 may render a graphical user interface associated with a web browser, for example. In aspects, the client device 102 may communicate over the network 150 with the application server 110.

The application server 110 is a server that enables a seller (who may post items for sale) and a buyer (who purchases the items) for interactively using the system 100 on the client device 102. The application server 110 may comprise applications including the online shopping app 112. The online shopping app 112 may provide a rendering of items for a purchase by the user.

In aspects, the online shopping app 112 may connect with the item receiver 122 of the online shopping server 120 to post information about an item for sale on an online shopping site (not shown). The information about the item may include a name, a brief description of the item, a quantity, a price, and one or more image data that depict the item. Additionally or alternatively, the information about the item includes category information of the item. For example, the item may be a laptop computer. The one or more images may include photos of the laptop computer in different views and a close-up of product information label with a product code and a serial number of the item. The online shopping app 112 may receive a confirmation from the online shopping server 120 when the online shopping server 120 successfully receives the information about the item and confirms that the item is not counterfeit. When the online shopping server 120 determines the item as counterfeit, the transaction disabler 128 may remove the item from listing on the online shopping site for sale.

The online shopping server 120 represents the applications/systems used for determining a counterfeit item. The online shopping server 120 controls the online shopping site by removing the counterfeit items listing for buyers for sale. The online shopping server 120 uses a counterfeit identification model to match an item against a stock of image data and determines the item as counterfeit. The item receiver 122 receives information about an item from the online shopping app 112 used by a seller through the interactive interface 104 on the client device 102. Among other things, the information about the item includes a name, a brief description, and image data of the item. The item matcher 124 matches the image data of the item against a collection of image data of various items using a counterfeit identification model. The counterfeit identification model (e.g., the trained model 144) is a trained model for predicting whether an item as an input is counterfeit by analyzing image data of the item and generating probability distribution of likelihood that the image data of the item matches with one or more images of counterfeit items.

In aspects, analyzing the image data may include a pixel level comparison of the image data of the item with one or more images of counterfeit items. Additionally or alternatively, analyzing the image data may include extracting features of the image data and comparing the features of the image data against known features of the one or more images of counterfeit items. Features of the image data for comparison may depend on a category of an item. For example, when a category of the item is electronic devices, features of the image data for the item may include a photo of a product label with a product serial number. In another example, when a category of the item is an accessory bag, the feature may include a close-up photo or printed patterns on the side of the accessory bag.

In aspects, use of the counterfeit identification model based on a machine-learning neural network and/or encoder-decoder models enables highly efficient matching of image data about the item with a set of image data associated with true counterfeit items. For example, use of the machine-learning models may include pattern-matching based on feature vectors associated with predefined portions of image data. Categories of the items may determine the predefined portion for matching. For example, the model may be trained to focus on comparing a printed logo pattern on the side view of items when the item is an accessory bag. The effect of the trained model becomes substantial when there are tens of millions of items and even more numbers of image data to compare. Furthermore, parts of prediction processing may be performed concurrently to improve performance of the matching process. For example, the model may perform processing predictions on pattern matching on distinct parts of the image data concurrently. In aspects, the concurrent processing for the matching may take place in real-time as the seller submits information about an item for sale on the online shopping site.

The counterfeit determiner 126 determines that the item is counterfeit using output from the item matcher 124. In aspects, the counterfeit determiner 126 may notify the seller by transmitting a result of the determination to the online shopping app 112. In some other aspects, the counterfeit determiner 126 transmits the determination and the information about the item to the transaction disabler 128. The transaction disabler 128 disables transactions associated with the item in the online shopping site. For example, the transaction disabler 128 may disable sales of the item when the item is already on listings on the online shopping site. Additionally or alternatively, the transaction disabler 128 may disable listing of the items that the seller has previously posted on the online shopping site for sales transaction. In yet another aspect, the transaction disabler 128 may notify buyers who have previously purchased the item from the seller and warn them about potentially problematic activities.

The model trainer 140 represents the applications/systems used for generating a counterfeit identification model and training the model for deployment as the trained model 144 in the online shopping server 120. In aspects, the model trainer 140 retrieves a set of image data from the image database 162 of the image data server 160.

The image data server 160 includes the image database 162. The image database 162 stores a collection of image data and metadata associated with one or more image data. For example, the image database 162 may store image data of items that have been confirmed as counterfeit in the past. Additionally or alternatively, the image database 162 may store image data of items have been confirmed as being stolen in the past. The image data server may provide interface for registering and for maintaining image data associated with counterfeit items and/or stolen items.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2B:
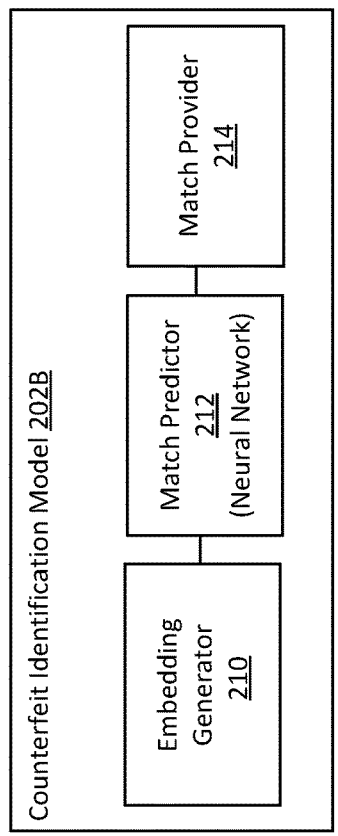
Figure 2A:
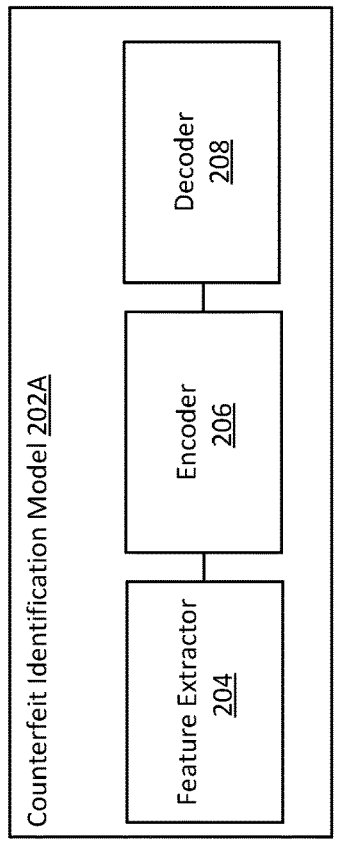

FIGS. 2A-B illustrate examples the counterfeit identification models according to the aspects of the present disclosure. In FIG. 2A, the system 200A illustrates a counterfeit identification model 202A using a transformer-based, encoder-decoder model. The counterfeit identification model 202A includes a feature extractor 204, an encoder 206, and decoder 208. The counterfeit identification model 202A receives information about an item. The information may include a name, a brief description, a price, and image data about the item. The image data about the item may include one or more photos of the item. The information about the item may include descriptions of respective image data. For example, a photo may be a front view of the laptop computer. Another photo may be a close-up view of a product label with a serial number of the item. In some other aspects, the image data may be without descriptions given by the seller.

The feature extractor 204 identifies and extracts features of the image data about the item. Features of the image data may include edge information of the image data, and color. In aspects, the features may include metadata of the image data. For example, the metadata may include a location of a photo taken, a setting of a camera or a scanner, and date/time of the photo taken. The metadata may be a part of the image file associated with the information about the item.

The encoder 206 encodes the image data and the features into a multi-dimensional vector as encoded data. The multi-dimensional vector may represent each encoded feature of the image data. The decoder 208 decodes the encoded image data. The decoder 208 generates output including probability distribution data. In some aspects, the counterfeit identification model 202A is based on a transformer model. The probability distribution data indicates a likelihood of the item matching one or more image data that represent true counterfeit items. Additionally or alternatively, the counterfeit identification model 202A may fine-tune the output from the decoder 208 for determining counterfeit for a task-specific dataset, which represents predetermined categories of items. For example, the predetermined categories of items may include handbag accessories, shoes, and pairs of vintage jeans. Each predetermined category may specify particular parts of the respective items to compare in finer details than other parts. For example, texture, top buttons, rivets, a waistband label, a tab label, an average market price, and the like.

In FIG. 2B, the counterfeit identification model 202B uses a neural network as a match predictor. The system 200B includes the counterfeit identification model 202B. The counterfeit identification model 202B includes an embedding generator 210, a match predictor 212 (a trained neural network), and a match provider 214. Similar to what has been described herein, the counterfeit identification model 202B receives information about an item. The information may include a name, a brief description, and image data about the item. The image data about the item may include one or more photos of the item. The information about the item may include descriptions of respective image data. For example, a photo may be a front view of the laptop computer. Another photo may be a close-up view of a product label with a serial number of the item. In some other aspects, the image data may be without descriptions given by the seller.

The embedding generator 210 generates embedding of the received information about the item, including the image data. In aspects, the embedding includes a multi-dimensional vector mapping of the image data. Embedding helps identify similarities of parts of the image data with parts of respective images of trained images. Additionally or alternatively, the embedding includes a multi-dimensional representation of metadata and other aspects of the information about the item. The embedding of the metadata may be useful to efficiently determine categories of the image data through processing vectors.

The match predictor 212 receives the embedding and generates a prediction of matching item. The match predictor 212 may a neural network for generating probability distributions of likelihood that the image data of the item matches with one or more images associated with counterfeit items. In aspects, the neural network is a multi-layer convolution neural network. In some other aspects, the neural network is a multi-layer recurring neural network.

The match predictor 212 outputs the most likely counterfeit item based on matching the image data and other information about the item and a confidence value expressed in a percentage value. For example, an output may indicate a counterfeit item X with a confidence (or a likelihood) value or 65%.

The match provider 214 provides output from the match predictor 212. In aspects, the match provider may provide a likelihood of the item being counterfeit as represented by a percentage and a description of the likely counterfeit item. For example, the match provider may provide that an item X is 75% likelihood of matching a counterfeit item Z. Based on the output, the counterfeit determiner (e.g., the counterfeit determiner 126 in FIG. 1) may determine that the item X is counterfeit. In some other aspects, the match provider may provide that an item Y is 25% likelihood of matching a counterfeit item Z2 as the most likely match. Based on the output, the counterfeit determiner may determine that the confidence value is less than a predetermined threshold (e.g., 60%). Accordingly the counterfeit determiner may determine that the item Y is not a counterfeit item.

FIG. 3 illustrates an example of a data structure of information about items in accordance with the aspects of the present disclosure. FIG. 3 illustrates an item table 300. The item table 300 includes item ID 302, status 304, item category 306, item category 306, matched counterfeit item ID 308, and seller ID 310. Item ID 302 represents an identifier of the item submitted by a seller for sales transactions on the online shopping site. Status 304 is a status of the item. In aspects, the status of the item includes whether the counterfeit determiner (e.g., the counterfeit determiner 126 in FIG. 1) has determined the item as counterfeit or not-for-sale. In aspects, an item may be not-for-sale when the item matcher matches the item as a stolen item. Not-for-sale items may include both counterfeit items and stolen items.

For example, item 5001, a laptop computer, has a status of being valid to be on the online shopping site. The item 5001 has no matching counterfeit item. Seller 1 submitted the item for sale. Item 5002, an accessory bag, is valid to be on the online shopping site. The item has no matching counterfeit item. Seller 2 submitted the item for sale.

Item 5003 is suspended from being on the online shopping site. The counterfeit determiner has determined the item as counterfeit, with the matched counterfeit item 8000. The matched counterfeit item 8000 represents a true counterfeit item. Seller 2 submitted the item for sale. In aspects, the model trainer receives image data associated with true counterfeit or stolen items from the image data server (e.g., the image database 162 in the image data server 160) as training data.

Item 5004 has been suspended from being on the online shopping site because the item matcher (e.g., the item matcher 124 in FIG. 1) matched the item with a stolen item (item 8002). Seller 2 submitted the item. Item 5005, accessory bag, is validly on the online shopping site. The item has no matching counterfeit item. Seller 2 submitted the item.

FIG. 4 illustrates an example of a data structure of maintaining sellers in accordance with the aspects of the present disclosure. FIG. 4 illustrates a seller table 400. The seller table 400 includes seller ID 402, seller status 404, items in the online shopping site 406 for sale, and counterfeit item 408. Seller ID identifies respective sellers as registered with the online shopping site. Seller status 404 indicates a status of the seller. For example, the seller status indicates whether the online shopping site permits the seller to engage in sales transactions and/or post items for sale. The seller status may include "suspended" when the seller is not allowed to engage in transactions as a result of submitting a counterfeit item. Items on the online shopping site 406 include item IDs of items from the seller on the online shopping site. Counterfeit item 408 includes one or more items submitted by the seller, for which the counterfeit determiner has determined as counterfeit.

For example, seller 1 is validly on the online shopping site for engaging in transactions. The seller has item 5001 available for sales transactions. The seller has no item for which the counterfeit determiner has determined as counterfeit. Seller 2 has been suspended from engaging in transactions in the online shopping site. In aspects, submitting an item for which the counterfeit determiner has determined is counterfeit caused the seller status of Seller 2 to be suspended. The suspension may be among measures taken by the online shopping site to prevent sales transactions of illegal or suspicious items. The seller has two items posted on the online shopping site: item 5002 and item 5005. The seller has two items for which the counterfeit determiner determined as counterfeit: item 5003 and item 5004. Additionally or alternatively, the seller table 400 may include a list of items that have been determined as being stolen. In aspects, a status of the seller may become suspended when the seller submits a stolen item for sale.

Figure 5:
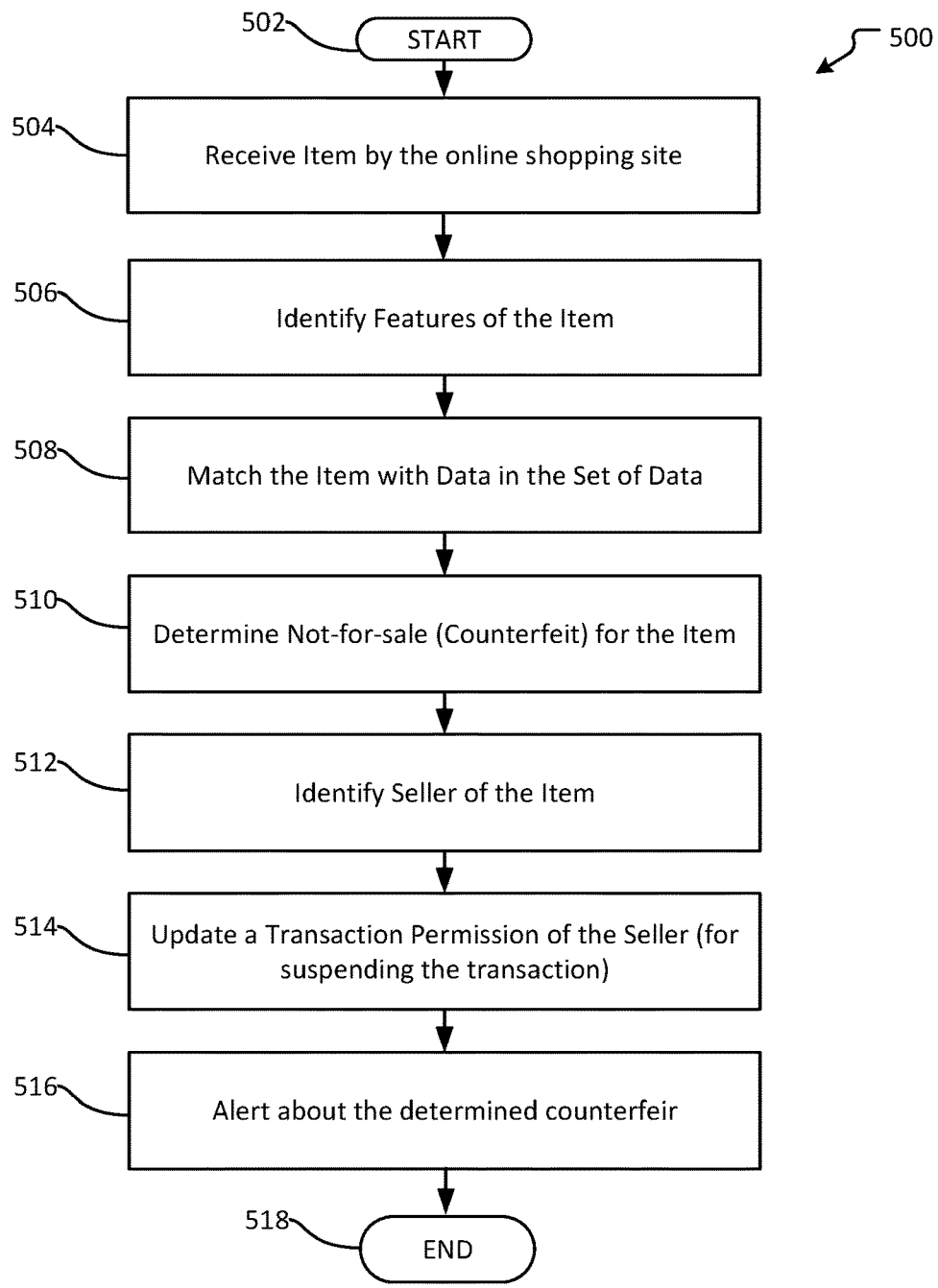
FIG. 5 illustrates an example of a method for determining a counterfeit item in accordance with aspects of the present disclosure.

FIG. 5 is an example of a method for determining an item as not-for-sale (e.g., counterfeit, stolen items) in accordance with aspects of the present disclosure. A general order of the operations for the method 500 is shown in FIG. 5. Generally, the method 500 begins with start operation 502 and ends with end operation 518. The method 500 may include more or fewer steps or may arrange the order of the steps differently than those shown in FIG. 5. The method 500 can be executed as a set of computer-executable instructions executed by a computer system and encoded or stored on a computer readable medium. Further, the method 500 can be performed by gates or circuits associated with a processor, an ASIC, an FPGA, a SOC or other hardware device. Hereinafter, the method 500 shall be explained with reference to the systems, components, devices, modules, software, data structures, data characteristic representations, signaling diagrams, methods, etc., described in conjunction with FIGS. 1, 2, 3, 4, and 6.

Following start operation 502, the method 500 begins with receive operation 504, which receives an item by the online shopping site. In aspects, a seller uses an online shopping app as a seller and uploads information about the item to the online shopping server. The information about the item may include a name, a short description, a category of the item, and one or more image data that represent the item. For example, the one or more image data may be a set of photos of the items from different views. The one or more image data may include a close-up photo of a product label with a product code and a serial number.

Identify operation 506 identifies one or more features of the item from the information about the item. The identify operation 506 uses the category, the short description and the one or more image data about the item to identify the features or characteristics of the item. For example, the identify operation 506 may identify that the item is under a category of an accessory bag with handles and is in brown color. In aspects, the identify operation 506 may analyze the image data to determine features. The features may include a logo printed on the item and a damage in some parts of the item.

Matching operation 508 matches the item with one or more items in a set of items. For example, the matching operation 508 may use a counterfeit identification model that has been trained with true counterfeit items. The counterfeit identification model may use a machine-learning model. Examples of the machine-learning model may include an encoder-decoder model and/or a deep neural network. In aspects, the trained counterfeit identification model takes information about the item as input and generates a probability distribution that indicates likelihoods of the item being counterfeit based on matching with image data of true counterfeit items. For example, the matching operation 508 provides three true counterfeit items as a result of the matching and the highest probability (or a confidence level of matching) among the three is 45%. In another example, the matching operation 508 provides one true counterfeit item with a probability of 90%. Additionally or alternatively to predicting counterfeit items, the model may be trained using image data about truly stolen items and output whether the item matches with one or more stolen items.

In aspects, the matching operation 508 may use a not-for-sale identification model for matching the item with one or more items of a set of not-for-sale items. Not-for-sale items may include either or both of counterfeit items and stolen items. In some aspects, stolen items may be genuine items and not counterfeit but not for sale in the online shopping site. The not-for-sale identification model may be trained using true not-for-sale items as training data. In some other aspects, the matching operation 508 may use a stolen item identification model for matching the item with one or more stolen items. The stolen item identification model may be trained using a set of true stolen items as training data.

Determine operation 510 determines the item as not-for-sale (e.g., counterfeit and stolen items). In aspects, the determine operation 510 compares a probability distribution as output from the matching operation. When the probability distribution data indicates a likelihood that is higher than a predetermined threshold, the determine operation 510 determines the item as not-for-sale (e.g., counterfeit). For example, the determine operation 510 determines the item as not-for-sale (e.g., counterfeit) when the highest value of the probability distribution data as an output from the model is higher than 80%.

Identify operation 512 identifies a seller of the item. For example, seller 2 in FIG. 3 submitted the item 5003, for which the counterfeit determiner has determined as counterfeit. In aspects, a seller of the item includes a seller who has submitted the item for sales transaction. When the item is already on listing of the online shopping site, the online shopping server may suspend the posting of the item to prevent sales of the highly likely counterfeit item.

Update operation 514 updates a transaction state (e.g., permission) of the seller. The online shopping server may suspend the seller from engaging in further transaction when the seller submits an item for which the counterfeit determiner determines as counterfeit.

Alert operation 516 alerts the seller about the determined status of the item being counterfeit. Additionally or alternatively, the alert operation 516 alerts the seller about an updated status (e.g., suspended) of the seller in light of the determined counterfeit item. In aspects, the alert operation 516 may add the information about the item to the training data for the counterfeit identification model for future training of the model.

Figure 6:
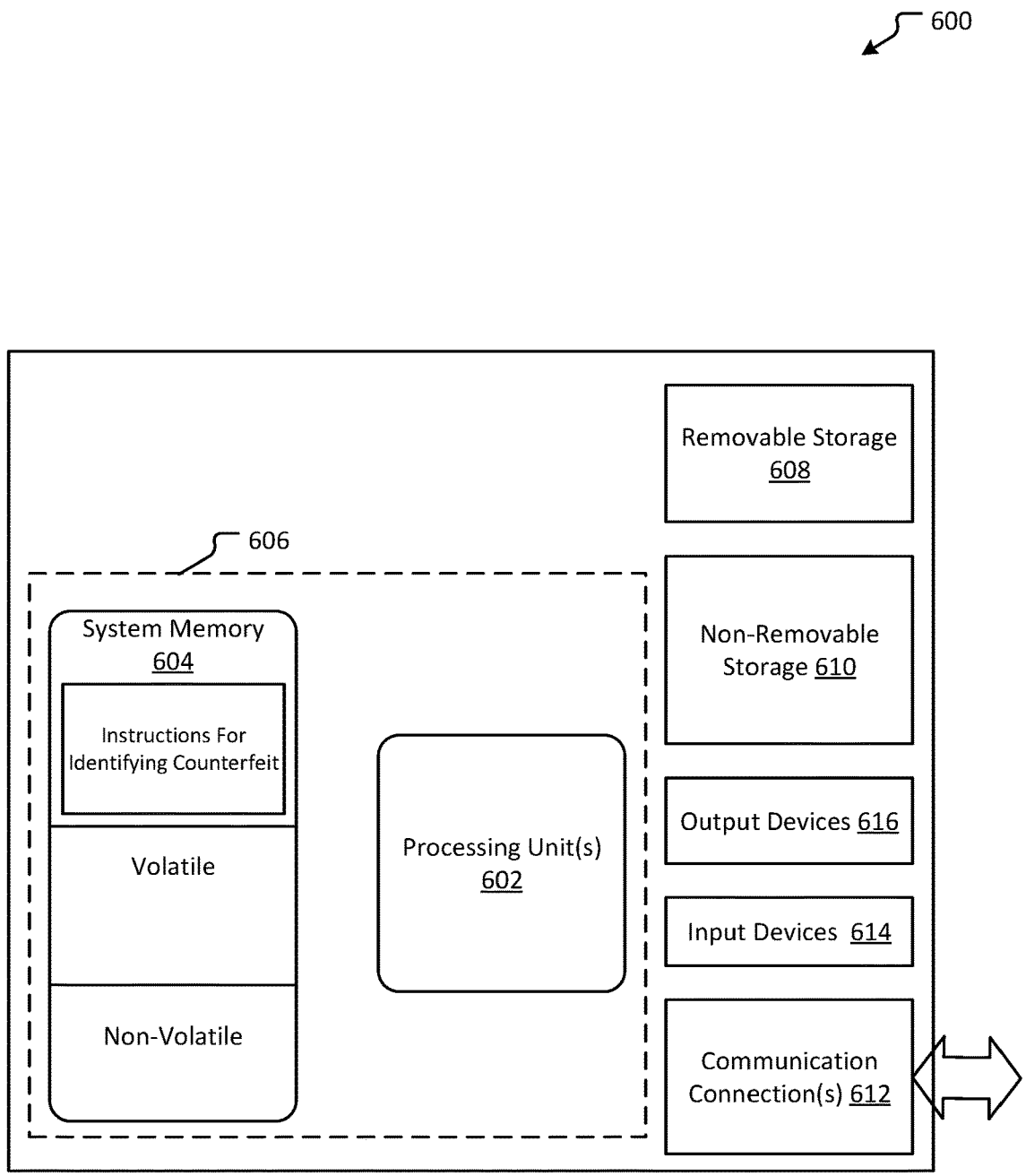
FIG. 6 is a block diagram illustrating example physical components of a computing device with which aspects of the disclosure may be practiced.

FIG. 6 illustrates a simplified block diagram of the device with which aspects of the present disclosure may be practiced in accordance with aspects of the present disclosure. One or more of the present embodiments may be implemented in an operating environment 600. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 600 typically includes at least one processing unit 602 and memory 604. Depending on the exact configuration and type of computing device, memory 604 (instructions to perform identifying a not-for-sale item as described herein) may be volatile (such as RAM), non-volatile (such as ROM, flash memory, etc.), or some combination of the two. This most basic configuration is illustrated in FIG. 6 by dashed line 606. Further, the operating environment 600 may also include storage devices (removable, 608, and/or non-removable, 610) including, but not limited to, magnetic or optical disks or tape. Similarly, the operating environment 600 may also have input device(s) 614 such as keyboard, mouse, pen, voice input, on-board sensors, etc. and/or output device(s) 616 such as a display, speakers, printer, motors, etc. Also included in the environment may be one or more communication connections, 612, such as LAN, WAN, a near-field communications network, point to point, etc.

Operating environment 600 typically includes at least some form of computer readable media. Computer readable media can be any available media that can be accessed by at least one processing unit 602 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 600 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for method for determining an item as counterfeit according to at least the examples provided in the sections below. the method comprises receiving information of an item associated with a transaction, wherein the information includes first data associated with the item; matching, based on a counterfeit identification model, the first data with at least second data in a set of data, wherein the set of data is associated with a set of counterfeit items in a database, wherein the counterfeit identification model includes a set of encoder and decoder, each trained using the set of counterfeit items training data in the database, and wherein the counterfeit identification model generates probability distributions of likelihood of the item being counterfeit; identifying, based on the matching first data with the at least second data, the item as counterfeit; and providing an alert associated with the item as counterfeit, causing suspending the transaction associated with the item. The first data includes image data, and the method further comprises determining, based on a category of the item, one or more features of the image data; and performing, based on the one or more features of the image data, a pixel-level comparison of at least a part of the image data and a set of stock photos associated with the set of counterfeit items. The method further comprises determining one or more features of the first data, wherein the one or more features include one or more of: a type of the item, one or more parts of the first data associated with the item, a color of the item, or a preservation condition of the item; matching the first data with the at least on item represented in the set of data using at least one of a trained neutral network or a trained transformer model; identifying, based on probability distributions associated with the matching, a seller of the item; and suspending the transaction of the item and one or more bidding processes associated with the seller. The transaction includes online bidding, and wherein the set of items includes a plurality of counterfeit items. The method further comprises receiving, from a seller, information of an item associated with a transaction; and suspending, based on identifying the item as counterfeit, the seller from engaging in the transaction of the item. The counterfeit identification model includes a trained encoder-decoder model, and wherein the counterfeit identification model includes a transformer model fined-tuned to one or more of predetermined categories of items for counterfeit identification. The image analysis includes one or more of: extracting features of the first data, predicting whether the first data matches one or more true counterfeit data using a probability distribution, and determining, based on the probability distribution, the item as counterfeit.

Another aspect of the technology relates to a system for identifying a not-for-sale item. The system comprises a processor; and a memory storing computer-executable instructions that when executed by the processor cause the system to: receiving information of an item associated with a transaction, wherein the information includes first data associated with the item; matching, based on a not-for-sale identification model, the first data with at least second data in a set of data, wherein the set of data is associated with a set of not-for-sale items in a database, wherein the not-for-sale identification model includes a set of encoder and decoder, each trained using the set of not-for-sale items training data in the database, and wherein the not-for-sale identification model generates probability distributions of likelihood of the item being not-for-sale; identifying, based on the matching first data with the at least second data, the item as not-for-sale; and providing an alert associated with the item as not-for-sale, causing suspending the transaction associated with the item. The first data includes image data, and the computer-executable instructions when executed further cause the system to: determine, based on a category of the item, one or more features of the image data; and perform, based on the one or more features of the image data, a pixel-level comparison of at least a part of the image data and a set of stock photos associated with the set of not-for-sale items, wherein the set of not-for-sale items include at least one of a counterfeit item or a stolen item. The computer-executable instructions when executed further cause the system to: determine one or more features of the first data, wherein the one or more features include one or more of: a type of the item, one or more parts of the first data associated with the item, a color of the item, or a preservation condition of the item; matching the first data with the at least on item represented in the set of data using at least one of a trained neutral network or a trained transformer model; identifying, based on probability distributions associated with the matching, a seller of the item; and suspending the transaction of the item and one or more bidding processes associated with the seller. The transaction includes online bidding, and wherein the set of items includes a plurality of not-for-sale items. The computer-executable instructions when executed further cause the system to: receive, from a seller, information of an item associated with a transaction;

and suspend, based on the identified item as not-for-sale, the seller from engaging in the transaction of the item. The counterfeit identification model includes a trained encoder-decoder model, and wherein the counterfeit identification model includes a transformer model fined-tuned to one or more of predetermined categories of items for counterfeit identification. The image analysis includes one or more of: extracting features of the first data, predicting whether the first data matches one or more true not-for-sale data using a probability distribution, and determining, based on the probability distribution, the item as not-for-sale.

In still further aspects, the technology relates to a computer-readable non-transitory recording medium storing computer-executable instructions. The computer-executable instructions, when executed by a processor, cause a computer system to receive information of an item associated with a transaction, wherein the information includes first data associated with the item; match, based on a not-for-sale identification model, the first data with at least second data in a set of data, wherein the set of data is associated with a set of not-for-sale items in a database, wherein the not-for-sale identification model includes a set of encoder and decoder, each trained using the set of not-for-sale items training data in the database, and wherein the not-for-sale identification model generates probability distributions of likelihood of the item being not-for-sale; identify, based on the matching first data with the at least second data, the item as not-for-sale; and provide an alert associated with the item as not-for-sale, causing suspending the transaction associated with the item. The first data includes image data, and the computer-executable instructions when executed further cause the system to: determine, based on a category of the item, one or more features of the image data; and perform, based on the one or more features of the image data, a pixel-level comparison of at least a part of the image data and a set of stock photos associated with the set of not-for-sale items, wherein the set of not-for-sale items include at least one of a counterfeit item or a stolen item. The computer-executable instructions when executed further cause the system to: determine one or more features of the first data, wherein the one or more features include one or more of types of the item, one or more parts of the first data for a detailed analysis, a color of the item, or a preservation condition of the item; determine one or more features of the first data, wherein the one or more features include one or more of: a type of the item, one or more parts of the first data associated with the item, a color of the item, or a preservation condition of the item; matching the first data with the at least on item represented in the set of data using at least a trained transformer model, wherein the trained transformer model is fine-tuned to at least the one or more of types of the item; identifying, based on probability distributions associated with the matching, a seller of the item; and suspending the transaction of the item and one or more bidding processes associated with the seller. The transaction includes online bidding, and wherein the set of items includes a plurality of not-for-sale items. The computer-executable instructions when executed further cause the system to: receive, from a seller, information of an item associated with a transaction; and suspend, based on the identified item as not-for-sale, the seller from engaging in the transaction of the item. The image analysis includes one or more of: extracting features of the first data, predicting whether the first data matches one or more true not-for-sale data using a probability distribution, and determining, based on the probability distribution, the item as not-for-sale.

Any of the one or more above aspects in combination with any other of the one or more aspect. Any of the one or more aspects as described herein.

What is claimed is:

1. A method for determining an item as counterfeit, the method comprising:
receiving information of an item listed for sale on an online marketplace, the item being associated with a transaction, wherein the information includes first data associated with the item;
generating, by an encoder of a counterfeit identification model, a multi-dimensional vector by encoding the first data, the multi-dimensional vector mapping the image data of the first data, the counterfeit identification model comprising a transformer-model that is specified to one or more predetermined categories of items;
decoding, by a decoder of the counterfeit identification model, the multi-dimensional vector to generate probability distribution data indicating a likelihood that the first data matches at least second data in a set of data, the set of data being associated with image data of a set of counterfeit items corresponding to the item in a database;
modifying, by the counterfeit identification model, the probability distribution data from the decoder based on the item being associated with a predetermined category, the predetermined category specifying one or more portions of the item to compare using one or more feature vectors associated with predefined portions of image data of the first data;
identifying, based on the probability distribution data, the item as counterfeit; and
providing an alert associated with the item as counterfeit, causing suspending of the transaction associated with the item.

2. The method of claim 1, further comprising:
determining, based on a category of the item, one or more features of the image data; and
performing, based on the one or more features of the image data, a pixel-level comparison of at least a part of the image data and a set of stock photos associated with the set of counterfeit items.

3. The method of claim 1, further comprising:
determining one or more features of the first data, wherein the one or more features include one or more of: a type of the item, one or more parts of the first data associated with the item, a color of the item, or a preservation condition of the item;
matching the first data with at least one item represented in the set of data using at least one of a trained neutral network or a trained transformer model;
identifying, based on probability distributions associated with the matching, a seller of the item; and
suspending the transaction of the item and one or more bidding processes associated with the seller.

4. The method of claim 1, wherein the transaction includes online bidding, and wherein the set of counterfeit items includes a plurality of counterfeit items.

5. The method of claim 1 further comprising:
receiving, from a seller, information of an item associated with a transaction; and
suspending, based on identifying the item as counterfeit, the seller from engaging in the transaction of the item.

6. The method of claim 1, wherein the counterfeit identification model includes a trained encoder-decoder model, and wherein the counterfeit identification model includes a transformer model associated with one or more of predetermined categories of items for counterfeit identification.

7. The method of claim 1, wherein an image analysis includes one or more of:
   extracting features of the first data,
   predicting whether the first data matches one or more true counterfeit data using a probability distribution, and
   determining, based on the probability distribution, the item as counterfeit.

8. A system for identifying a not-for-sale item, the system comprising:
   a processor; and
   a memory storing computer-executable instructions that when executed by the processor cause the system to perform operations comprising:
      receiving information of an item listed for sale on an online marketplace, the item being associated with a transaction, wherein the information includes first data associated with the item;
      generating, by an encoder of a not-for-sale identification model, a multi-dimensional vector by encoding the first data, the multi-dimensional vector mapping the image data of the first data, the not-for-sale identification model comprising a transformer-model that is specified to one or more predetermined categories of items;
      decoding, by a decoder of the not-for-sale identification model, the multi-dimensional vector to generate probability distribution data indicating a likelihood that the first data matches at least second data in a set of data, the set of data being associated with image data of a set of not-for-sale items corresponding to the item in a database;
      modifying, by the not-for-sale identification model, the probability distribution data from the decoder based on the item being associated with a predetermined category, the predetermined category specifying one or more portions of the item to compare using one or more feature vectors associated with predefined portions of image data of the first data;
      identifying, based on the probability distribution data, the item as not-for-sale; and
      providing an alert associated with the item as not-for-sale, causing suspending of the transaction associated with the item.

9. The system of claim 8, wherein the operations further comprise:
   determining, based on a category of the item, one or more features of the image data; and
   performing, based on the one or more features of the image data, a pixel-level comparison of at least a part of the image data and a set of stock photos associated with the set of not-for-sale items, wherein the set of not-for-sale items include at least one of a counterfeit item or a stolen item.

10. The system of claim 8, wherein the operations further comprise:
    determining one or more features of the first data, wherein the one or more features include one or more of: a type of the item, one or more parts of the first data associated with the item, a color of the item, or a preservation condition of the item;
    matching the first data with at least one item represented in the set of data using at least one of a trained neutral network or a trained transformer model;
    identifying, based on probability distributions associated with the matching, a seller of the item; and
    suspending the transaction of the item and one or more bidding processes associated with the seller.

11. The system of claim 8, wherein the transaction includes online bidding, and wherein the set of not-for-sale items includes a plurality of not-for-sale items.

12. The system of claim 8, wherein the operations further comprise:
    suspending, based on the identified item as not-for-sale, a seller from engaging in the transaction of the item.

13. The system of claim 8, wherein the not-for-sale identification model includes a trained encoder-decoder model, and wherein the not-for-sale identification model includes a transformer model associated with one or more of predetermined categories of items for not-for-sale identification.

14. The system of claim 8, wherein an image analysis includes one or more of:
    extracting features of the first data,
    predicting whether the first data matches one or more true not-for-sale data using a probability distribution, and
    determining, based on the probability distribution, the item as not-for-sale.

15. A computer-readable non-transitory recording medium storing computer-executable instructions that when executed by a processor cause a computer system to perform operation comprising:
    receiving information of an item listed for sale on an online marketplace, the item being associated with a transaction, wherein the information includes first data associated with the item;
    generating, by an encoder of a not-for-sale identification model, a multi-dimensional vector by encoding the first data, the multi-dimensional vector mapping the image data of the first data, the not-for-sale identification model comprising a transformer-model that is specified to one or more predetermined categories of items;
    decoding, by a decoder of the not-for-sale identification model, the multi-dimensional vector to generate probability distribution data indicating a likelihood that the first data matches at least second data in a set of data, the set of data being associated with image data of a set of not-for-sale items corresponding to the item in a database;
    modifying, by the not-for-sale identification model, the probability distribution data from the decoder based on the item being associated with a predetermined category, the predetermined category specifying one or more portions of the item to compare using one or more feature vectors associated with predefined portions of image data of the first data;
    identifying, based on the probability distribution data, the item as not-for-sale; and
    providing an alert associated with the item as not-for-sale, causing suspending of the transaction associated with the item.

16. The computer-readable non-transitory recording medium of claim 15, wherein the operations further comprise:
    determining, based on a category of the item, one or more features of the image data; and
    performing, based on the one or more features of the image data, a pixel-level comparison of at least a part of the image data and a set of stock photos associated with the set of not-for-sale items, wherein the set of not-for-sale items include at least one of a counterfeit item or a stolen item.

17. The computer-readable non-transitory recording medium of claim 15, wherein the operations further comprise:
- determining one or more features of the first data, wherein the one or more features include one or more of types of the item, one or more parts of the first data for a detailed analysis, a color of the item, or a preservation condition of the item;
- matching the first data with at least one item represented in the set of data using at least a trained transformer model, wherein the trained transformer model is associated with at least the one or more of types of the item;
- identifying, based on probability distributions associated with the matching, a seller of the item; and
- suspending the transaction of the item and one or more bidding processes associated with the seller.

18. The computer-readable non-transitory recording medium of claim 15, wherein the transaction includes online bidding, and wherein the set of not-for-sale items includes a plurality of not-for-sale items.

19. The computer-readable non-transitory recording medium of claim 15, wherein the operations further comprise:
- suspending, based on the identified item as not-for-sale, a seller from engaging in the transaction of the item.

20. The computer-readable non-transitory recording medium of claim 15, wherein an image analysis includes one or more of:
- extracting features of the first data,
- predicting whether the first data matches one or more true not-for-sale data using a probability distribution, and
- determining, based on the probability distribution, the item as not-for-sale.

* * * * *